United States Patent [19]
Moss

[11] 3,877,682
[45] Apr. 15, 1975

[54] AUTOMATIC CHEMICAL MEASURING AND MIXING MACHINE

[75] Inventor: Lester I. Moss, Hackensack, N.J.

[73] Assignee: Mosstype Corporation, Waldwick, N.J.

[22] Filed: Mar. 8, 1974

[21] Appl. No.: 448,921

[52] U.S. Cl. ........................ 259/7; 222/145; 259/95
[51] Int. Cl. ........................... B01f 7/22; B01f 15/04
[58] Field of Search ............ 259/4, 5, 6, 7, 8, 9, 10, 259/95, 97, 115, 96, 23, 24, 43, 44, 66, 67, 64, 65, 116, 154, 149, 165; 222/145; 137/3

[56] References Cited
UNITED STATES PATENTS

| | | | |
|---|---|---|---|
| 2,958,516 | 11/1960 | Wall et al. | 259/95 |
| 3,217,927 | 11/1965 | Bale | 222/145 |
| 3,495,808 | 2/1970 | Klein | 259/8 |
| 3,608,869 | 9/1971 | Woodle | 259/7 |
| 3,612,356 | 10/1971 | McVey | 222/145 |

Primary Examiner—Robert W. Jenkins

[57] ABSTRACT

An automatic measuring and mixing machine for producing a limited quantity of a solution constituted by two or more components. The components drawn from separate sources, are first fed into a measuring chamber whose full capacity is equal to a volume unit of the desired volumetric ratio of the components. The measuring chamber drains into a mixing tank from which the mixture of components is pumped into a holding tank. The holding tank supplies the user, and when the level of the mixture in the holding tank falls below a predetermined low point a signal is produced which initiates a new measuring and mixing cycle.

9 Claims, 1 Drawing Figure

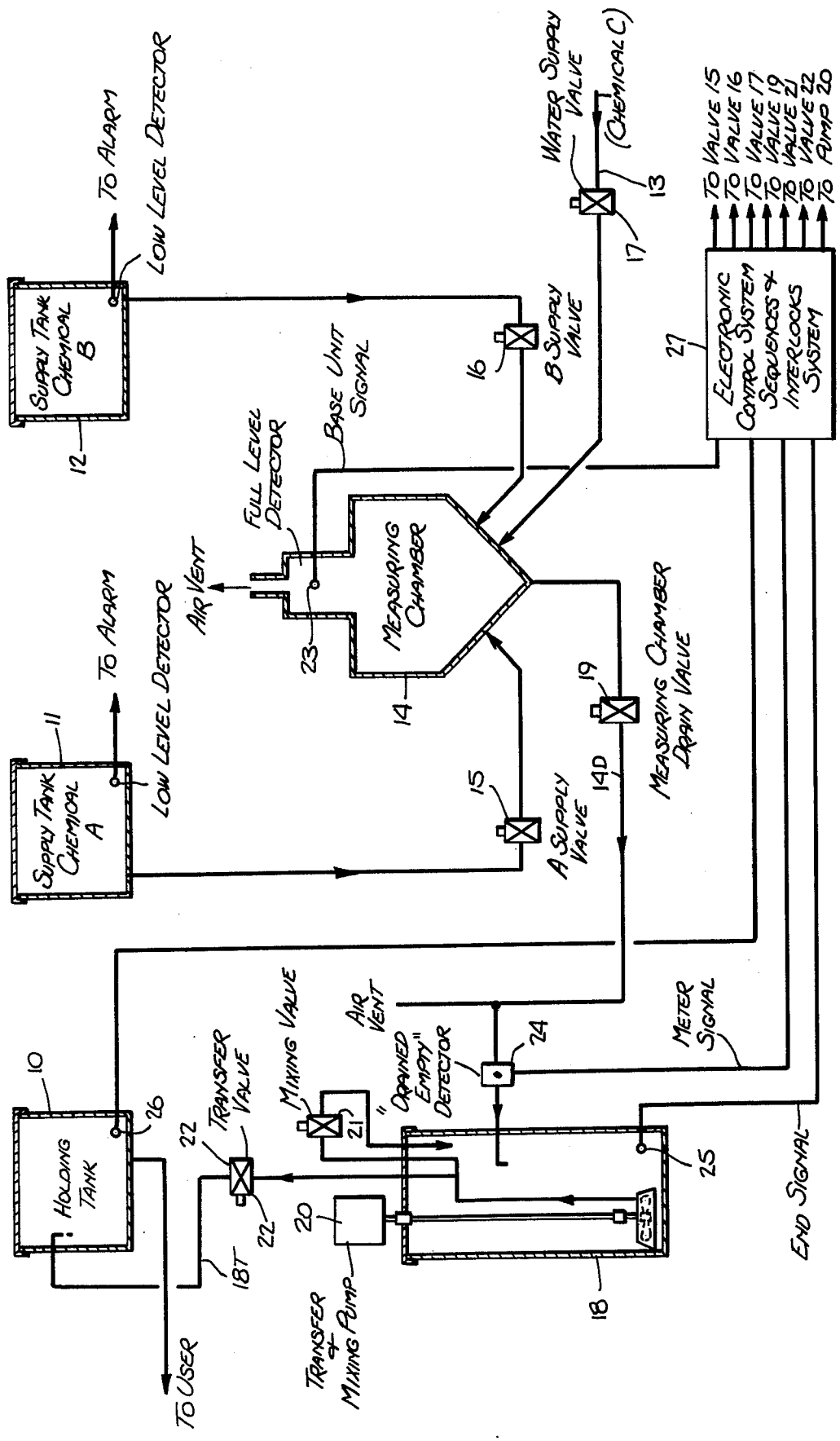

AUTOMATIC CHEMICAL MEASURING AND MIXING MACHINE

BACKGROUND OF THE INVENTION

This invention relates generally to an automatic measuring and mixing machine for producing a limited quantity of a solution constituted by two or more chemical components, and more particularly to a machine for automatically preparing replenisher solutions for film processors.

In automatic film processors of standard design, the exposed photographic film is transported by conveyor belts through a succession of tanks containing developer and fixer solutions and wash water. The development time is controlled by setting the machine speed. Processors are generally equipped with semi or fully automatic replenishment systems for the addition thereto of working solutions. In such systems, replenisher pumps are activated in order to deliver measured amounts of working solution to the automatic processor. Thus, existing automatic film processors are designed to keep development constant by close control of time, temperature and developer strength.

The replenisher solution is prepared by appropriate dilution and mixing of two chemical components and a solvent. Since the chemical nature of these components forms no part of the present invention, they will hereafter be referred to as Chemical A and Chemical B, which, in practice, may be in the form of concentrated liquids or dry powder, the solvent or diluting agent therefor being water and being referred to as Chemical C.

The conventional procedure for preparing a replenisher solution is to manually measure out appropriate amounts of chemicals A, B and C into a stationary storage tank, usually one having a capacity of about 25 to 30 gallons. The mixture is then stirred either by motor-driven agitators or manually, to produce a solution of the desired concentration. The quantity of solution prepared in this fashion is usually sufficient to last a few days or more, depending on the demand therefor in a particular film processor.

This manual technique for preparing replenisher solution has many drawbacks, including the following:

1. Since the preparation of the solution is carried out manually, the procedure is time-consuming and relatively expensive in terms of labor costs.

2. Because errors may arise in measuring out proper amounts of the replenisher components, the resultant solution may be deficient or unworkable, thereby contaminating the development tank in the film processor.

But even when the working solution is properly prepared, the fact that it is usually ready well in advance of consumption, gives rise to a loss in strength due to continuous oxidation and other chemical changes which are initiated once the chemicals are mixed. Consequently, though the replenisher solution has full potency when consumed shortly after preparation, the effectiveness of the solution in the course of storage is steadily diminished. Hence the quality of processing may be degraded, or it may be necessary to discard the remaining portion of the solution after a few days' storage. But in any event, with a solution subject to chemical changes, it is difficult to maintain and control the development activity of the processor at an even level.

SUMMARY OF THE INVENTION

In view of the foregoing, the main object of this invention is to provide an automatic measuring and mixing machine adapted to measure and dispense predetermined quantities of two or more components to form a solution thereof. While the invention is particularly useful in preparing ready-to-use solutions of replenisher for automatic film processors, it will be recognized that the machine is applicable to many other types of chemical processes requiring automatic measurement and mixing of solutions.

More particularly, it is an object of the invention to provide a machine of the above type which monitors the level of solution in a holding tank containing the solution, and when the level falls below a predetermined point, automatically initiates a new operating cycle wherein measured amounts of the constituents are dispensed into the mixing tank to produce a fresh supply of the solution. Alternatively, the level monitor may be arranged to produce a signal, causing an operator to initiate a new cycle.

A significant aspect of the invention resides in the fact that the constituents of the solution are not intermixed until a solution demand is registered, and that no more solution is prepared than is necessary for a relatively brief period of consumption whereby prolonged oxidation, degradation or loss of strength of the solution is minimized. And while only a relatively small quantity of solution is prepared at any one time, at no time does the system run out of prepared solution, so that when used in conjunction with an automatic processor or a group thereof, there is never an interruption in the supply.

Also an object of the invention is to provide an automatic measuring and mixing machine in which the volumetric amounts of chemicals dispensed are those exactly required for a developer solution in their proper ratios, thereby producing a solution having optimum characteristics. Another important advantage of the invention is that the machine may be programmed to provide any desired ratio of the chemical components and the solvent therefor.

Briefly stated, these objects are attained in an automatic measuring and mixing machine having a measuring chamber. Each chemical unit in the desired ratio of the chemicals being mixed is constituted by a volume equal to the effective full capacity of the measuring chamber. The entire contents of the measuring chamber is drained into a mixing tank whose contents are transferred to a holding tank. The chemicals to be intermixed are separately stored and are selectively fed through respective signal-controlled supply valves to the measuring chamber. Control signals for actuating the supply valves are produced by an electronic control system which is responsive to sensors which provide inputs to the control system indicative of the state of the measuring chamber and of the mixing and holding tanks and which is programmed to mix the constituents of the solution in a predetermined sequence.

If therefore the desired ratio by volume is one volume unit of chemical A, three volume units of chemical B and two volume units of chemical C, the control system is programmed to provide an operating cycle in the course of which the measuring chamber is completely filled once by chemical A, three times by chemical B and twice by chemical C, the chamber after each filling being completely drained and emptied into the mixing tank.

Where chemical C is water, the two necessary volume units of water are so dispensed whereby water is fed into the measuring chamber only after chemical A is supplied thereto to provide a volume unit of water serving to wash out the measuring chamber before chemical B is fed thereto in order to prevent an interaction of chemicals A and B in the measuring chamber. Water is again fed to the measuring chamber to provide the second unit of water after the chamber has served to measure three units of chemical B. Thus upon completion of the cycle, the measuring chamber is purged in readiness for the next operating cycle. In effect, therefore, the measuring chamber acts as a measuring spoon which ladles out as many volume units of the several components as are required for the mixture, and no more.

The chemicals intermixed in the mixing tank are pumped into the holding tank whose output is then available to the user. The holding tank is provided with a low level sensor to produce a start signal when the tank requires a fresh charge of solution, the start signal being applied to the control system to initiate a new cycle.

OUTLINE OF DRAWING

For a better understanding of the invention, as well as other objects and further features thereof, reference is made to the following detailed description to be read in conjunction with the annexed drawing, whose single FIGURE is a block diagram showing a preferred embodiment of an automatic measuring and mixing machine in accordance with the invention.

DESCRIPTION OF INVENTION

Structure of Machine

Referring now to the drawing, there is shown a machine in accordance with the invention, including a storage or holding tank 10 whose capacity is such as to be sufficient to meet the anticipated demand by one or more film processors or other users, thereby minimizing degradation of the solution. For example, assuming that the machine is intended to supply a replenisher solution to four film processors, the tank must be large enough to contain a workable supply of solution for all processors plus a reserve amount which would satisfy the user's demand during the time it takes to make a fresh solution. In practice therefore, the mixing cycle is so timed, the volume measuring unit is so sized and the quantity of reserve in holding tank 10 is made such as to meet the anticipated maximum rate of useage by the processors.

Tank 10 may be provided with a floating ball-type lid to minimize air contact. Similar lid sealing expedients are used with all other tanks in the machine, the tanks being fabricated of stainless steel or suitable plastics which are impervious to the chemicals contained therein.

The solution is produced by intermixing components constituted by chemical A, chemical B and chemical C. Chemicals A and B, which may be in concentrated liquid or flowable powder form, are stored in supply tanks 11 and 12, respectively, or in other suitable sources of supply. The water supply which is chemical C is obtained from a water supply line 13. In practice, the supply tanks for chemicals A and B are sized to hold a commercially packaged cubitainer of the chemical plus a few additional mixing charges.

Chemical A from tank 11 is fed by gravity flow through a signal-controlled valve 15 into a measuring chamber 14 whose full capacity is equal to the base unit of the ratio of the components to be intermixed to produce the desired solution.

Chemical B is supplied by gravity-flow to measuring chamber 14 by way of a signal-controlled valve 16, whereas chemical C which is water is supplied to the same chamber through a signal-controlled valve 17. All valves in the machine may be electromagnetically activated or of any other type which is normally closed and which is caused to open by means of a control signal, the valve remaining open as long as the signal is present.

Measuring chamber 14 drains into a mixing tank 18 through a signal-controlled valve 19. Mixing tank 18 is provided with a transfer and mixing pump 20 which serves either to pump the chemical components held therein through a signal-controlled mixing valve 21 back into the tank, thereby recirculating and intermixing the components to produce the desired solution, or to pump the solution into holding tank 10 through a signal-controlled transfer valve 22 placed in transfer line 18T.

Thus when pump 20 is operating while transfer valve 22 is closed and mixing valve 21 is open, mixing tank functions in the mixing mode to intermix the components drained therein from the measuring chamber. And when pump 20 is operating while transfer valve 22 is open and mixing valve 21 is closed, then mixing tank functions in the transfer mode to convey the solution therein to holding tank 10.

Disposed in measuring chamber 14 is a sensor 23 adapted to detect the level of chemical component therein and to produce a signal when the chamber is exactly full. This signal is hereafter referred to as a "full" signal in that it indicates that the measuring chamber now contains one volume unit of the component supplied thereto.

A sensor 24 is interposed in the drain line 14D extending between measuring chamber 14 and mixing tank 18 to detect the flow of the component from the chamber to the tank and to produce a signal when the measuring chamber is fully drained, this signal being hereafter referred to as the "empty" signal. Hence when the measuring chamber is filled to capacity, a "full" signal is generated, and when the chamber is fully drained and emptied into the mixing tank, an "empty" signal is generated.

A sensor 25 is disposed in mixing tank 18 to monitor the level of solution therein and to produce a signal when the tank is exhausted, thereby indicating the end of a cycle, this signal being hereinafter referred to as the "end" signal. A sensor 26 is disposed in holding tank 10 to detect the level of solution therein and to produce a signal when this tank is at a low point where only the reserve is left, the tank being in need of a fresh charge. Since this signal initiates the start of a new cycle to manufacture the fresh charge of solution, it is hereafter referred to as the "start" signal.

In practice, the various level sensors may be of the resistance or conductivity type provided with stainless steel probes which make contact with the tank contents. The nature of the sensors, all of which may be of commercially available types, forms no part of the present invention.

The "full" signal from sensor detector 23, the "empty" signal from sensor 24, the "end" signal from sensor 25 and the "start" signal from sensor 26 are applied as inputs to an electronic control system 27 adapted to produce suitable output control signals in a pre-programmed sequence. These control signals are sequentially applied to valves 15, 16, 17, 19, 21 and 22 and to pump 20, to carry out a full cycle of operation. This cycle is initiated when a "start" signal is received by the control system and is terminated when an "end" signal is received.

The electrical circuit for this purpose may be in solid state form whereby all necessary switching and timing actions responsive to the input signals are carried out by circuits including transistors, diodes or SCR devices. Alternatively, electromagnetic or motor-operated switches may be used to carry out the necessary functions. In either case, the circuit arrangement is such as to respond to the input signals to generate control signals for actuating the valves and the pump in a predetermined sequence serving to produce a solution in the holding tank having the desired ratio of chemical components.

In practice, the supply tanks for chemicals A and B may be equipped with detectors coupled to an alarm indicator which is activated when the tank supply runs low so that these tanks may be maintained with an adequate supply of chemicals thereby avoiding any interruption in the operation of the machine. A detector-indicator may also be used to indicate water pressure and to provide an indication when water pressure is below a safe level. Sensors may also be used to call attention to the existence of leakage from the supply valves.

Operation of the Machine

To illustrate the operation, we shall assume that the required solution has the following ratio of components:

Chemical A - one unit

Chemical B - two units

Chemical C - two units

Each chemical unit is constituted by a volume equal to the effective full capacity of measuring chamber 14. If therefore this capacity is one liter, then the base unit of the ratio is 1 liter and the desired ratio (1A + 2B + 2C) is 1 liter of chemical A, to 3 liters of chemical B, to 2 liters of chemical C, which in the case of a replenisher solution is water.

We shall further assume that at the outset all valves are closed, pump 20 is inactive and holding tank 10 is filled with replenisher solution. The user then proceeds to draw solution from the tank until a point being reached where the tank is low and only has a reserve left whose amount depends on the setting of sensor 26. This causes sensor 26 in the holding tank to produce a "start" signal to initiate a new cycle of operation which proceeds while the user continues to draw reserve solution from the tank, this cycle being completed before the reserve solution is exhausted.

The electronic control system 27 responds to the input "start" signal to produce an output control signal which is applied to supply valve 15, the valve opening to admit chemical A from tank 10 into measuring chamber 14. This action continues until measuring chamber 14 is full. This condition is detected by sensor 23 which produces a "full" signal that is applied to control system 27 which responds by cutting off the control signal to supply valve 15 and by applying a control signal to drain valve 19. Thus supply valve 15 closes to shut off the supply of chemical A to the measuring chamber 14 and valve 19 then opens to drain the unit of chemical A contained in the measuring chamber into mixing tank 18.

When the measuring chamber is fully drained as indicated by sensor 24, the resultant "empty" signal which is applied to control system 27 causes the system to cut off the control signal to drain valve 15 and to produce and apply a control signal to water supply valve 17. Hence drain valve 15 is again closed and now valve 17 is open to feed water into measuring chamber 14 until the chamber is full, as indicated by the "full" signal. At this point, water supply valve 17 is cut off and drain valve 19 is then reopened to drain the unit of water from measuring chamber 14 into mixing tank 18. The water in measuring chamber 14 serves to purge the chamber of any residual chemical A.

When measuring chamber 14 is fully drained of water as indicated by the "empty" signal from sensor 24, the drain valve 19 is cut off and a control signal is then applied to supply valve 16 which opens to admit chemical B into the measuring chamber. At this point, since the mixing tank already contains chemical A and water, the control signal acts to activate pump 20 to initiate a mixing action and mixing valve 21 is opened to permit recirculation of the mix.

Supply valve 16 is cut off when the "full" signal is produced by sensor 23 indicating that the chamber is full with chemical B, at which point drain valve 19 is opened to drain the volumetric unit of chemical B into mixing tank 18. When the unit of chemical B is fully drained, as indicated by the "empty" signal, a second unit of chemical B is produced by repeating the operating sequence for chemical B.

When the desired two units of chemical B are dispensed into mixing tank 18, water supply valve 13 is again opened to admit another unit of water into the measuring chamber 14, which unit is then drained into mixing tank 18. This final unit of water serves to purge measuring tank 18 of residual chemical B so that the tank is clean in readiness for the next cycle of operation.

At this stage in the cycle, mixing tank 18 contains one unit of chemical A, two units of chemical B and two units of chemical C (water). With pump 20 operating and mixing valve 21 open, the components A, B and C in the mixing tank are recirculated therein, in the course of which the desired solution is developed. This mixing action continues for a predetermined period sufficient to fully intermingle components A and B with the water (component C). At the end of this mixing period, the control signal applied to mixing valve 21 is cut off and a control signal is produced which is applied to transfer valve 22.

With pump 20 still operating and transfer valve 22 open, the solution in mixing tank 18 is transferred through line 18T to holding tank 10. When all of the solution from mixing tank 18 has been transferred, an "end" signal is produced by sensor 25 in the mixing tank, this signal being applied to the electronic control system to cut off both pump 20 and transfer valve 22 and to reset the system to its quiescent state in readiness for the next cycle of operation. This next cycle does not take place until the solution in the holding tank 10 is at a predetermined low point, at which point a cycle "start" signal is generated.

Modifications

It will be appreciated that while the system is described as supplying a solution to a single user, in practice the machine capacity may be sufficient to feed a battery of users which consume the solution in the holding tank. Also while the machine has been described to provide a solution whose ratio is 1A - 2B - 2C, in practice the component ratio may be any desired ratio such as 1A - 1B - 6W - 1A - 1B - 4W or 2A - 2B - 2C. Also, in practice, essentially the same technique may be used for a greater number of components, the machine in all cases being characterized by extremely precise volumetric proportioning, intermixing of the several constituents and storing of the mixed products.

The machine is simple to operate since there is nothing to do but add raw chemicals A and B thereto when the supply thereof is low. The machine is universal for all currently used commercial chemistries and a mixture ratio may be selected depending on the chemistry in use. Because only a relatively small quantity of chemicals is mixed on demand, the storage of mixed chemicals for a prolonged period is avoided, and deterioration thereof is minimized. Also while a gravity flow system is used to feed the chemicals to the mixing chamber, in practice one may use pumps for this purpose, in which case the control signal which actuates a given supply valve also actuates the associated pump.

While there has been shown and described preferred embodiments of the invention, it will be appreciated that various changes and modifications may be made therein without departing from the spirit of the invention.

I claim:

1. In a machine for measuring and mixing two or more chemical components having a desired volumetric ratio to produce a limited quantity of a solution,
   A. a measuring chamber having a capacity whose volume is equal to a unit volume in the desired volumetric ratio;
   B. a mixing tank coupled to the measuring chamber to receive the contents thereof;
   C. supply valve means interposed between separate sources of said components and said measuring chamber;
   D. drain valve means interposed between said measuring chamber and said mixing tank; and
   E. a control system responsive to signals indicative of the level of the contents in said measuring chamber to operate said supply and drain valve means in a sequence in which the components from said sources are each fed into said measuring chamber until the chamber is completely filled, after which the entire contents of the chamber is discharged into said mixing tank, said system being programmed to provide said desired component ratio in said mixing tank.

2. In a machine as set forth in claim 1, the combination further including a holding tank and means including a transfer valve to transfer the contents of said mixing tank into said holding tank, said control system including means responsive to a signal indicating that the mixing tank contains the desired amount of solution to operate said transfer valve to effect a transfer of the solution into the holding tank.

3. In a machine as set forth in claim 2, further including means to produce a signal indicating that the holding tank is low to initiate a new cycle of operation.

4. A machine for measuring and mixing two or more chemical components having a desired volumetric ratio, one of which is a solvent, to produce a limited quantity of a solution, said machine comprising:
   A. a measuring chamber having a capacity whose volume is equal to a unit volume of the desired volumetric ratio;
   B. means including normally closed supply valves to feed the components from separate sources thereof into said measuring chamber,
   C. a mixing tank for the components;
   D. means including a normally closed drain valve to discharge the entire contents of said chamber into said mixing tank;
   E. means to sense the level of component in said measuring chamber to produce a "full" signal when the chamber is full, and to sense the drainage of the component into said mixing tank to produce an "empty" signal when the measuring chamber is fully drained, and
   F. an electronic control system for controlling said valves in a predetermined sequence to produce said desired ratio of components in said tank, said system acting to open each of said supply valves to feed a selected component into said measuring chamber until said "full" signal is produced, in response to which the opened supply valve is closed and the drain valve is opened to fully drain the component from the metering chamber into the mixing tank, at which point said "empty" signal is produced in response to which one of said supply valves is opened.

5. A machine as set forth in claim 4, wherein said sources are so disposed relative to said measuring chamber as to effect feed by gravity flow into the chamber.

6. A machine as set forth in claim 4, wherein at least one of said sources is a supply tank having detector means to indicate that the tank supply is low.

7. A machine as set forth in claim 4, wherein said mixing tank is provided with a pump and means including a normally closed mixing valve to recirculate the pumped solution back into said mixing tank, said control system producing a control signal to simultaneously operate said pump and to open said mixing valve when components of said mixture are contained in said mixing tank.

8. A machine as set forth in claim 7, further including a holding tank and means including a transfer valve to transfer the contents of said mixing tank into said holding tank, said control system including means responsive to a signal indicating that all components of the solution in the desired ratio are contained in said mixing tank to cut off said mixing valve and to open said transfer valve without interrupting the operation of said pump.

9. An automatic metering and mixing machine for producing a limited quantity of a solution formed by chemicals A and B dissolved in water, said solution having a predetermined volumetric ratio of chemicals A, B and water, said machine comprising:
   A a supply tank for a chemical A, B a supply tank for a chemical B,
C a water supply source,
D a measuring chamber having a capacity whose volume is equal to a unit volume in the desired ratio;
E means including separate normally closed supply valves coupling said supply tanks and said water supply source to said measuring chamber,
F a mixing tank,
G drain means including a normally closed drain valve connecting said measuring chamber to said mixing tank,
H a holding tank coupled to a user,
I means including a normally closed transfer valve connecting said mixing tank to said holding tank,
J a first sensor in said metering chamber to produce a "full" signal when the chamber is completely full,
K a second sensor in said drain means to produce an "empty" signal when the measuring chamber contents are fully drained into the mixing tank,
L a third sensor in the mixing tank to produce an "end" signal when the contents thereof are fully transferred to said holding tank,
M a fourth sensor in the holding tank to produce a "start" signal when the holding tank is low, and
N an electronic control system responsive to said signals to initiate a new cycle upon receipt of said "start" signal, in the course of which cycle said supply valves are selectively opened in response to said "empty" signal to fill said chamber with units of said chemicals A and B and water, and said drain valve is opened in response to said "full" signal after each filling to discharge the entire contents from said chamber into the mixing tank until the mixing tank contains a solution having the desired ratio of components, at which point said transfer valve is opened after a period during which mixing takes place to effect transfer of the solution to the holding tank, at the end of which transfer said "end" signal is produced to reset the control system in readiness for the next cycle of operation.

* * * * *